United States Patent [19]
Bennett

[11] 4,132,537
[45] Jan. 2, 1979

[54] DOWN DRAFT SCRUBBER APPARATUS

[76] Inventor: Dillard A. Bennett, 108 Brown Dr., Sanford, Fla. 32771

[21] Appl. No.: 881,767

[22] Filed: Feb. 27, 1978

[51] Int. Cl.² .................... B01D 47/02; B01D 47/06
[52] U.S. Cl. ........................................ 55/226; 55/223; 55/228; 55/238; 55/244; 261/116; 261/123; 261/DIG. 9
[58] Field of Search ............... 261/23 R, 116, 117, 261/122, 123, 36 R, DIG. 9, DIG. 54; 55/223, 226, 228, 229, 238, 244

[56] References Cited
U.S. PATENT DOCUMENTS

| | | | |
|---|---|---|---|
| 1,073,621 | 9/1913 | Murray | 261/DIG. 9 |
| 1,986,653 | 1/1935 | Wade | 261/116 X |
| 3,284,435 | 11/1966 | McIlroy et al. | 261/116 X |
| 3,334,471 | 8/1967 | Herron | 55/226 X |
| 3,448,562 | 6/1969 | Wisting | 261/116 X |
| 3,516,647 | 6/1970 | Jaffe et al. | 261/122 X |
| 3,726,065 | 4/1973 | Hausberg et al. | 55/226 X |
| 3,729,898 | 5/1973 | Richardson | 55/238 X |
| 3,854,908 | 12/1974 | Hausberg et al. | 261/116 X |
| 3,912,469 | 10/1975 | Ewan et al. | 261/117 X |
| 3,993,448 | 11/1976 | Lowery | 55/227 X |

Primary Examiner—Richard L. Chiesa
Attorney, Agent, or Firm—Duckworth, Hobby, Allen & Pettis

[57] ABSTRACT

A gas scrubber apparatus for cleaning impurities from a gas such as air, having a pair of tanks partially filled with water, and each having a tower extending vertically therefrom. Gas is fed to one or the other tower, past a plurality of sprinklers located in the towers, and against the water in the bottom of the tank, and then out an outlet. A pump pumps the water through a filter from each tank to the sprinklers in the tower, and the water may have added chemicals for improving the scrubbing action.

9 Claims, 4 Drawing Figures

DOWN DRAFT SCRUBBER APPARATUS

BACKGROUND OF THE INVENTION

The present invention relates to gas scrubbers for feeding air having solid particles and impurities therein through sprinkler towers to a collection pond, and then out an opening to the atmosphere.

In the past, it has been quite common to provide a great variety of air cleaning and gas cleaning systems of the scrubber type, in which the gas is fed through a shower of water and in which small particles of matter are collected by the water as the gas passes therethrough. The gas is thereby cleansed, and the impurities collected in the water, which may be fed off or collected and settled in a pond. Typical prior gas scrubbers may be seen in U.S. Pat. No. 3,854,908 for an apparatus for discharging fluid gases from blast furnaces and the like, and in U.S. Pat. No. 3,729,898 for an apparatus for the removal of particulate material such as fumes, fog or mist from a gas stream, by passing the gas stream through a venturi scrubber, where liquid droplets are dispersed into the venturi scrubber. U.S. Pat. No. 3,912,469 shows an apparatus for the removal of contaminants from gas streams, as does U.S. Pat. No. 3,993,448 for a scrubber and combustion apparatus. This latter patent illustrates the feeding of gas through a serpentine passageway having baffles therein, along with sprinkler systems, and includes a drain for removing collected waste from the scrubber. The present invention utilizes a pair of interconnected vertically extending towers attached to adjacent tanks for holding water having chemicals added thereto and the gas input attached to both towers in a manner that one tower and tank are always connected to the input, while one tower and tank are always disconnected for cleaning. This system advantageously allows for the continuous operation of a scrubber for use with gases ladened with large amounts of impurities, such as from coal mines and the like.

SUMMARY OF THE INVENTION

A down draft type gas scrubber apparatus having a pair of open supply and collector tanks is mounted adjacent each other and filled with water having a surfactant therein, and each tank has a vertically extending gas scrubbing tower mounted thereover. A plurality of sprinkler nozzles are mounted in each tower at different levels, and are connected through a pump to the fluid in the tank that the tower is mounted over. A gas input line is connected to both towers, and a motor actuated valve connects the input to only one tower at a time. An air output is located on the base portion of the tower adjacent the tank so that the flow of air adjacent the liquid in the tank can be controlled.

BRIEF DESCRIPTION OF THE DRAWINGS

Other objects, features, and advantages of the present invention will be apparent from the written description and the drawings, in which.

DESCRIPTION OF THE PREFERRED EMBODIMENT

Figure 1:
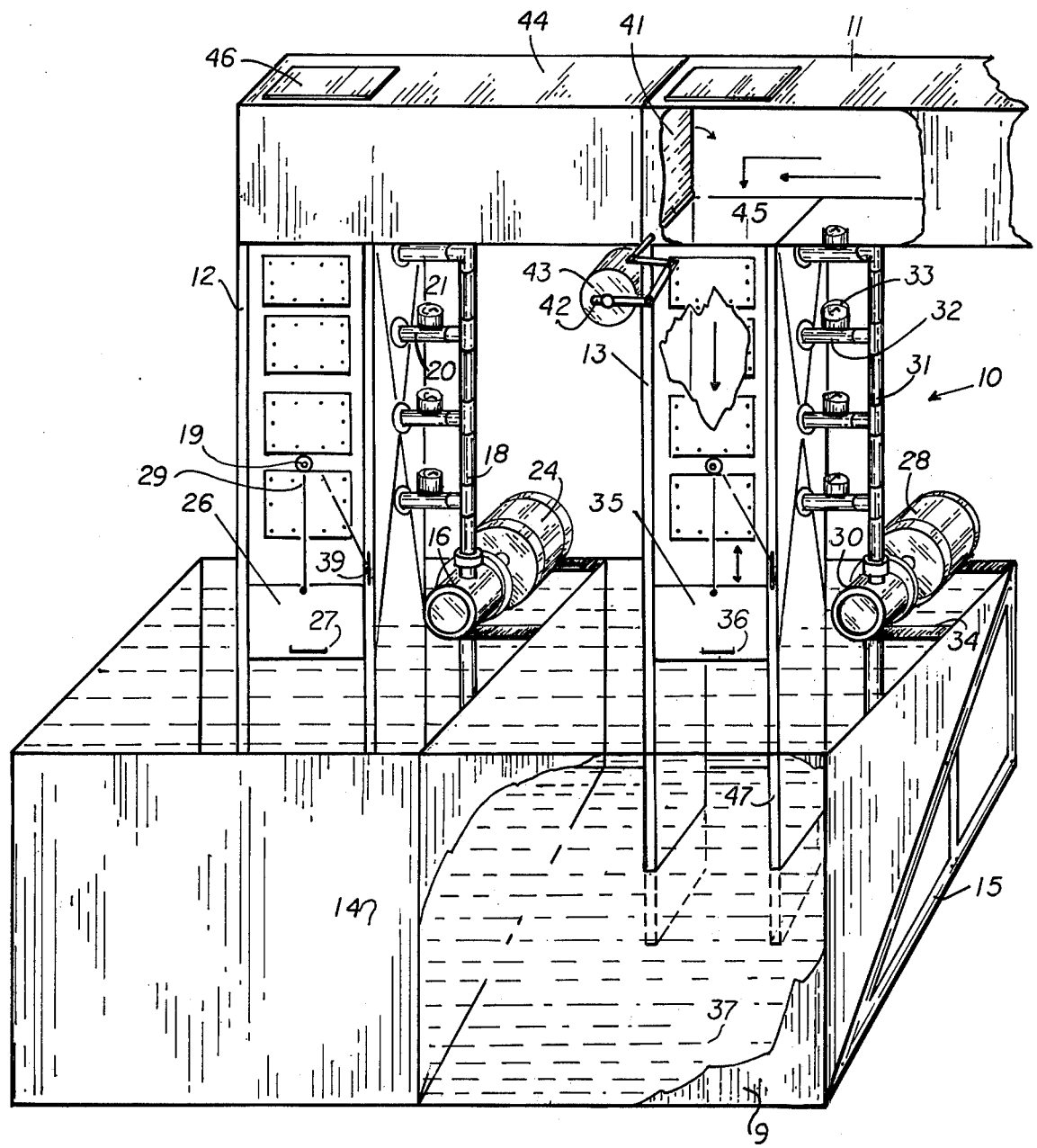
FIG. 1 is a perspective view of a down draft gas scrubbing apparatus in accordance with the present invention.
Figure 2:
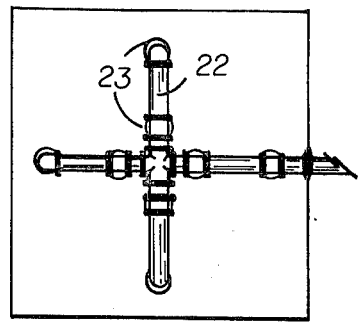
FIG. 2 is a sectional view taken through one tower of the gas scrubbing apparatus of FIG. 1.
Figure 3:
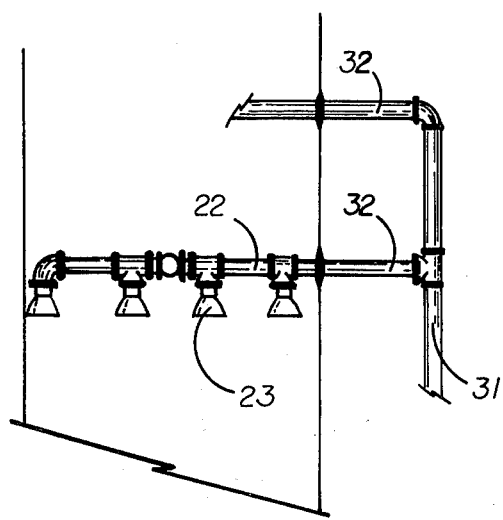
FIG. 3 is a cutaway sectional view taken through a portion of one tower to show the side view of the sprinklers in each tower.

Referring to the drawings, a gas scrubbing apparatus 10 is illustrated having an input air line 11 connected to a vertically extending gas scrubbing tower 12 and a matching tower 13 with the gas scrubbing tower 12 connected to an open supply and collector tank 14 while the gas scrubbing tower 13 is connected to a second supply and collector tank 9. Tanks 14 and 9 are open at the top and have angled bottoms and are supported by a frame 15 and are mounted adjacent each other and are filled with water, which may have a chemical, such as a surfactant or wetting agent, added thereto to increase the efficiency of the liquid in removing particulate matter from the air. The tower 12 has a pump 16 connected by pipe 17 (FIG. 4) to the inside of the tank 14 and by pipe 18 to four branch lines 20, each having a solenoid actuated valve 21 mounted therein, and each line 20 extending into the tower 12. Inside the tower 12, at the end of each branch 20, are located four crossed feeder pipes 22, each having a pair of sprinkler nozzles 23 mounted thereto and spaced in the tower to provide a uniform spraying within the tower. Four levels of sprinklers are mounted so that one or more may be turned on at any one time to increase the removal of impurities from the air passing through the tower. The pump 16 is driven by an electric motor 24, mounted on the top 25 of the tank 14. In addition, the tower 12 has a sliding door 26 having a handle 27 which can be slid along the tower to open at different levels to control the flow of air from the tower 12 and tank 14. A pulley 19 is mounted to each tower and has a cable 29 passing therethrough and attached to doors 26 and 35 for lifting or lowering the doors. Cable 29 is attached to a cleat 39 to position the doors 26 and 35 in position and tower 13 also has a motor 28, pump 30, and vertically extending water pipe extending into the tank 9. The tower has a door 35 with a handle 36 for adjusting the escape of air from the system. In addition, frame members 34 are positioned to support the pump 30 and motor 28 which are attached to the frame 15 from behind the tank wall.

Figure 4:
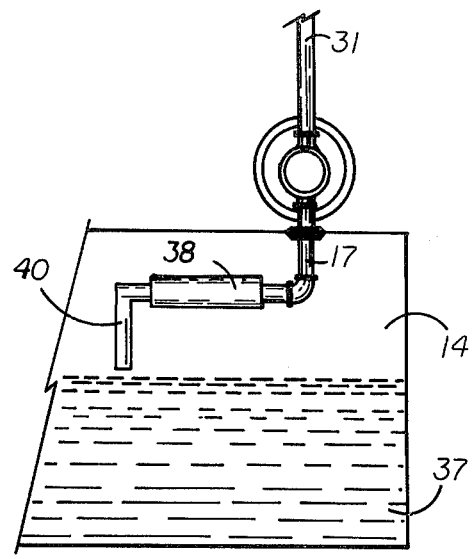
FIG. 4 is a cutaway sectional view showing the inside of one tank and the connection to the pump of the gas scrubbing apparatus of FIGS. 1 through 3.

The water line 17 can be seen in FIG. 4 extending into the tank 14 filled with water 37 and is connected to a filter 38 which is in turn connected to a pipe 40, which extends into the water 37. Filter 38 filters any impurities from the water, which is fed to the towers. The input line 11 has a damper type valve 41 connected by a linkage 42 to an electric motor or rotatable solenoid 43 which is mounted to the side of the tower 13 and which rotates the valve element 41 from one position as shown to block the air entering the input 11 from the end portion 44 of the input duct, and which moves to a second position to close the opening 45 into the tower 13 and thereby allow the air from the input duct 11 to proceed and pass into the tower 12, while being blocked from the tower 13. In addition, a plurality of plates 46 allow entry to different portions of the system for cleaning or repair and are anchored in position with machine screws or bolts. Each tower is supported with frame members 47 extending into the tanks 14 and 9.

The system operates by the particulate ladened air entering the input duct 11 which may be pumped with an air pump or fan as desired but the air is also moved by the down draft of the water sprinkler systems in each tower. As the air is moved from the duct 11, it moves into either tower 12 or 13 depending upon the position of the valve element 41 and flows through a plurality of levels of sprinklers in each tower, where the air is directed into either tank 14 or 9 against the surface of the liquid in the tank, which further collects any particulate matter passing thereover. The particulate matter is directed toward the bottom of the angled bottom tanks by the circulation of the water caused by the angled tank bottom with the incoming air impacting against the top of the angle where the pressure builds up on the air in the tank and is forced out into the atmosphere. The openings 26 and 35 can be adjusted for different air flows and pressures with cables 29 mounted on pulleys 19. The use of a wetting agent and a plurality of sprinkler levels in each tower as well as directing the air directly onto a pond of water and then back up, is especially effective in removing large amounts of particulate matter in air, such as might be found in a coal or other mining operation, and in addition, since the tank bottoms become filled with large amounts of particulate matter over short periods, such as 8 hours, a pair of towers and tanks are provided with a motor which can be timer actuated, if desired, for shifting from one tower to the next, thereby allowing one tank to be cleaned while the other one is in operation, and thereby maintaining continuous operation.

The towers, input ducts, and tanks can be made of any material desired, but typically would be made of sheet steel and can utilize any water pumps and electric motors and solenoid valves which are all commerically available items, along with a damper motor for actuating the valve separating the towers. Accordingly, the present invention is not to be construed as limited to the particular forms disclosed herein, which are to be regarded as illustrative rather than restrictive.

I claim:

1. A down draft gas scrubber apparatus comprising in combination:
    a pair of supply and collector tanks mounted adjacent each other;
    a plurality of vertically extending gas scrubbing towers, each tower being operatively connected to one supply and collector tank;
    a plurality of downwardly facing sprinkler nozzles mounted in each said tower;
    pump means coupled between said supply and collector tanks and said plurality of sprinkler nozzles for supplying a liquid to said nozzles;
    a gas input line connected to said pair of towers to supply gas thereto;
    gas outlet means located in each said tower for allowing gas to escape therefrom after passing through said tower; said gas outlet means including an adjustable sliding door mounted on a lower portion of each tower adjacent each supply and collector tank for adjusting the flow of gas therefrom;
    valve means connected to said input line between said towers for connecting said input to one tower at a time, said valve means being connected to said input line between said towers and being an electrically driven valve operating a door covering the entrance to one tower in one position, and covering said input line between said towers in a second position, whereby alternate towers clean gas passing therethrough and impinging upon a liquid in said supply and collector tank.

2. The apparatus in accordance with claim 1, in which said pump means includes an electrically driven pump attached to each supply and collector tank and having a water line extending into the tank for drawing water from the tank and into the sprinkler towers.

3. The apparatus in accordance with claim 2, in which said pair of supply and collector tanks are partially filled with water having a wetting agent therein.

4. The apparatus in accordance with claim 3, in which there are a plurality of levels of sprinklers, each level having at least four sprinklers mounted on four arms extending from the middle into the tower.

5. The apparatus in accordance with claim 4, in which eight sprinkler heads are used.

6. The apparatus in accordance with claim 6, in which four levels of sprinklers are used.

7. The apparatus in accordance with claim 6, in which a solenoid valve is connected into each of said plurality of sprinklers on each level.

8. The apparatus in accordance with claim 6, in which a pulley is attached to each tower and has a cable coupled thereto connected to each door for lifting said door.

9. The apparatus in accordance with claim 1, in which each said supply and collector tank has an angled bottom with the tower located therein so that gas is impinged against the liquid in the tank at the angled bottom's shallow portion, thereby creating a circulation in the water in said tank directing collected particulate matter to the bottom portion of said tank.

* * * * *